(12) United States Patent
Pang et al.

(10) Patent No.: US 6,516,386 B1
(45) Date of Patent: *Feb. 4, 2003

(54) METHOD AND APPARATUS FOR INDEXING A CACHE

(75) Inventors: Roland Pang, Phoenix, AZ (US); Gregory Mont Thornton, Aloha, OR (US); Bryon George Conley, Aloha, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,163

(22) Filed: Dec. 31, 1997

(51) Int. Cl.⁷ .............................................. G06F 12/00
(52) U.S. Cl. ............................ 711/118; 711/3; 711/203
(58) Field of Search ............................ 711/3, 147, 204, 711/207, 203, 118, 128, 205, 119, 100; 712/238; 710/51

(56) References Cited

U.S. PATENT DOCUMENTS

| | | | | |
|---|---|---|---|---|
| 5,014,195 A | * | 5/1991 | Farrell et al. | 711/128 |
| 5,060,137 A | * | 10/1991 | Bryg et al. | 711/205 |
| 5,067,078 A | * | 11/1991 | Talgam et al. | 711/3 |
| 5,265,220 A | * | 11/1993 | Kinoshita | 711/205 |
| 5,307,477 A | * | 4/1994 | Taylor et al. | 711/3 |
| 5,412,787 A | * | 5/1995 | Forsyth et al. | 711/207 |
| 5,542,062 A | * | 7/1996 | Taylor et al. | 711/3 |
| 5,606,683 A | * | 2/1997 | Riordan | 711/207 |
| 5,640,339 A | * | 6/1997 | Davis et al. | 365/63 |
| 5,696,925 A | * | 12/1997 | Koh | 711/204 |
| 5,699,551 A | * | 12/1997 | Taylor et al. | 711/207 |
| 5,727,180 A | * | 3/1998 | Davis et al. | 711/100 |
| 5,740,416 A | * | 4/1998 | McMahan | 711/204 |
| 5,854,943 A | * | 12/1998 | McBride et al. | 710/51 |
| 5,953,747 A | * | 9/1999 | Steely, Jr. et al. | 711/147 |
| 5,956,746 A | * | 9/1999 | Wang | 711/204 |
| 5,956,752 A | * | 9/1999 | Mathews | 711/204 |
| 6,092,172 A | * | 7/2000 | Nishimoto et al. | 711/207 |
| 6,145,054 A | * | 11/2000 | Mehrotra et al. | 711/119 |

* cited by examiner

*Primary Examiner*—David Hudspeth
*Assistant Examiner*—Fred F. Tzeng
(74) *Attorney, Agent, or Firm*—Kenyon & Kenyon

(57) ABSTRACT

A method for indexing a cache includes searching on a cache index using a partial physical address, the partial physical address including any bits of the virtual address which are untranslated between the virtual address and the physical address. The partial physical address is used to identify a block of the cache index sets that might contain an address of requested data. The identification is performed prior to translation of the virtual address to the physical address. Once identified, the block is read out into an auxiliary memory structure. After the full physical address becomes available, the block is multiplexed down to one set, and a compare is performed on the ways of the set to determine if the requested data is in the cache and, if so, which way the data is in. A device for achieving the method includes a cache index organized into two arrays, each having a number of sets and a number of ways. One of the arrays may used to store micro-tags for way prediction. In addition, the device includes an auxiliary memory structure for receiving and storing intermediate search results.

35 Claims, 13 Drawing Sheets

METHOD AND APPARATUS FOR INDEXING A CACHE

FIELD OF THE INVENTION

The present invention relates to address searching within a cache index. In particular, the present invention relates to address searching within a cache index using a partial physical address.

BACKGROUND OF THE INVENTION

Data is stored in memory according to a physical address scheme. Software programmers, however, write program code that requires the retrieval of data using a virtual or linear address scheme (referred to herein as the "virtual address"). Therefore, it becomes necessary for a system to translate a virtual address for a piece of data to a physical address before the data can be read from physical memory.

Many conventional searching techniques require that the full physical address be translated from the virtual address of the requested data prior to initiating a search. This significantly slows down the process of actually retrieving the data from memory, especially if the data is stored in high speed cache memory. Since a physical address is necessary before identifying and/or retrieving data from a cache, many conventional cache systems must wait until the translation from the virtual to the physical address is complete. This process can delay a search by a clock cycle or more.

In an attempt to solve this problem, other known cache systems have implemented a technique for searching an index for cache data based upon a partial physical address. This technique is based upon the recognition that a virtual address and a physical address share some address bits in common, so that these bits are available to the system immediately.

Generally, caches and cache indexes are organized into a number of sets, with each set containing one or more entry locations, or ways. In order to begin a partial-address search using the above-mentioned techniques, the available string of bits (i.e. those bits common to the virtual and physical address) must be of sufficient length to uniquely identify the individual set which might contain the requested data. According to known systems, only then may the system read out an individual set whose ways may be later searched to determine the location of requested data.

For example, for some systems, address bits 0–11 for a virtual and physical address are the same. In this example, bits 0–6 are used for addressing data within each entry of the cache, and therefore are not used to index the entries themselves.

For smaller caches, for example 16 kilobyte caches, it is possible to begin searching a cache index using bits 7–11 as many such caches are organized into 32 or fewer sets. This is possible because bits 7–11 can identify 32 individual sets (the five bits forming $2^5$, or 32, unique binary numerals). Thus for caches with 32 or fewer sets, if bits 7–11 are available they may be immediately used to uniquely identify the individual set which might contain the requested data.

Larger caches, however, for example 256 kilobyte caches, typically contain more than 32 sets. A 256 kilobyte cache containing, for example, 256 sets requires an 8-bit string (e.g. bits 7–14) to effectively begin a search of the cache index. Known cache systems, therefore, have not initiated a search of a cache index for large caches using bits 0–11, since these systems require bits 12–14 to initiate the search anyway. These systems must wait until the translation process is complete, and the full physical address is available, before initiating a search of the cache index. The problem with this method, however, is that one or more clock cycles are wasted waiting for the translation process to finish prior to beginning the search for cache data.

SUMMARY OF THE INVENTION

The method for searching a cache index includes the steps of receiving a virtual address of a requested data element which has at least one common bit which is untranslated between the virtual address and a physical address and searching the cache index using the at least one common bit, before the virtual address is completely translated, to identify a selected block. The cache index may be organized into blocks, each block containing a plurality of sets. Each of the plurality of sets may contain at least one way, each of the ways containing an address tag.

An embodiment of a device according to the present invention includes a cache index organized into a number of sets and ways, and an auxiliary memory structure for receiving and storing intermediate search results.

DETAILED DESCRIPTION

Figure 1A:
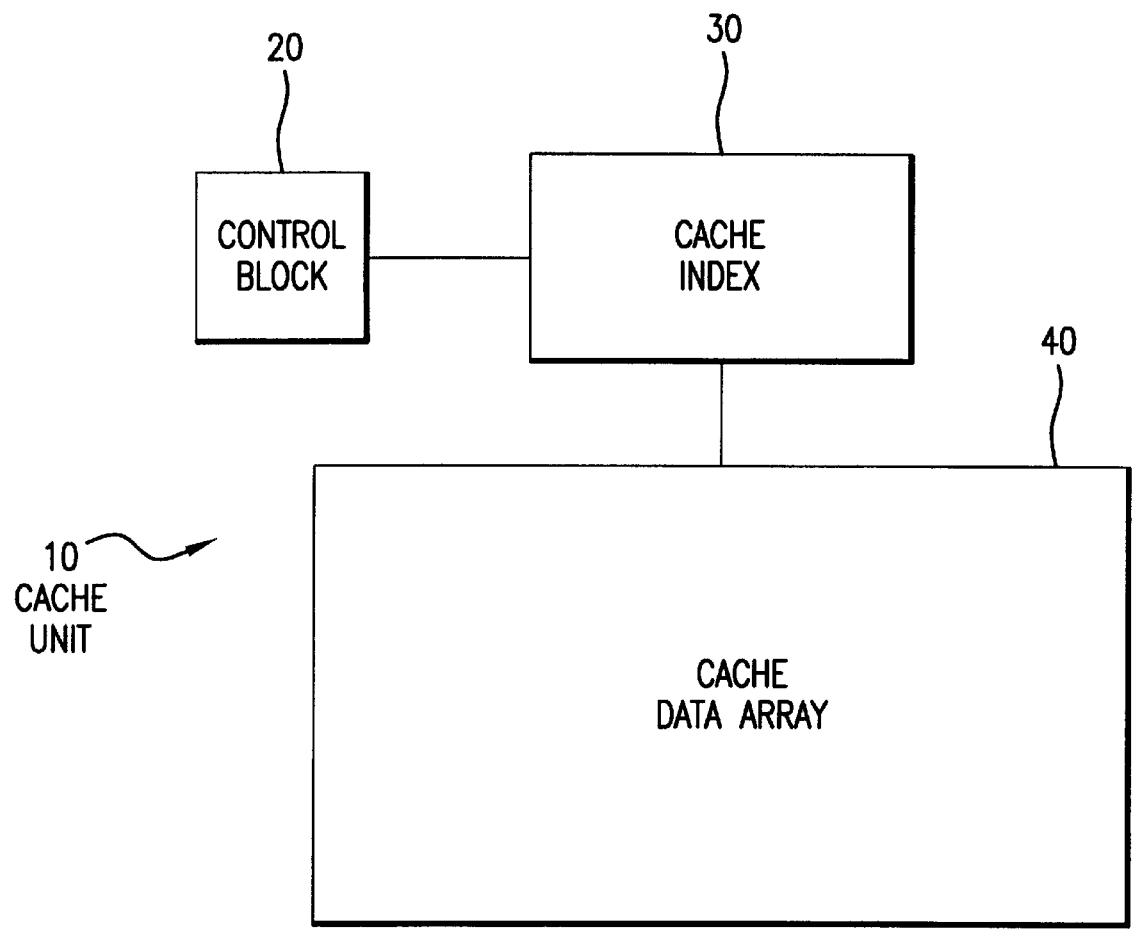
FIG. 1A shows a schematic view of a cache unit including an embodiment of a cache index according to the present invention.
Figure 1B:
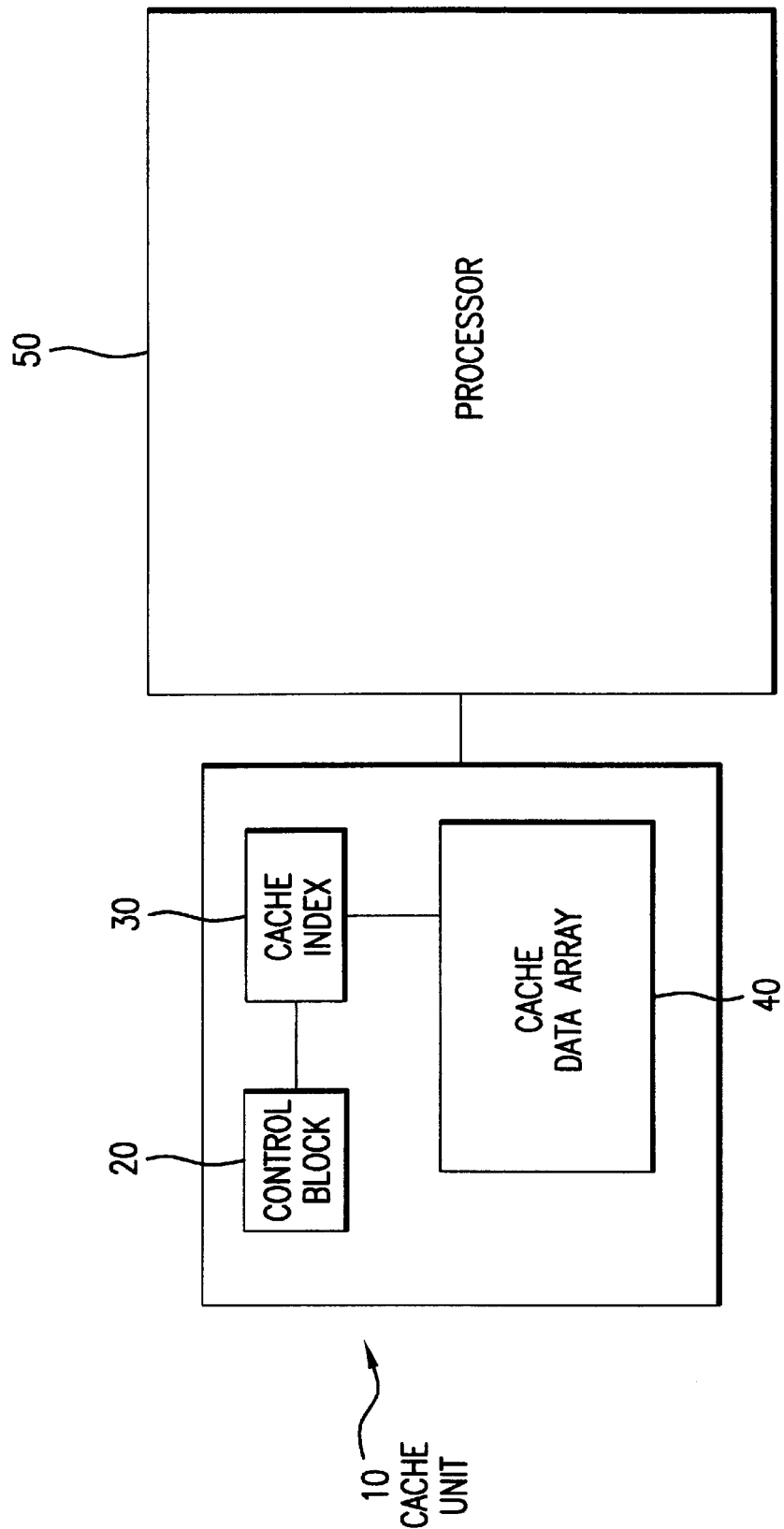
FIG. 1B shows a schematic view of the cache unit of FIG. 1 connected to a processor.

FIG. 1A shows a cache unit 10 including an embodiment of a cache index according to the present invention. This system includes a cache index 30 connected to a cache data array 40. The functions of the cache index 30 are controlled by control block 20. The control block 20 may be any type of controlling circuit or processor. As shown in FIG. 1B, the cache unit 10 may be connected, for example, to a processor 50.

Figure 1C:
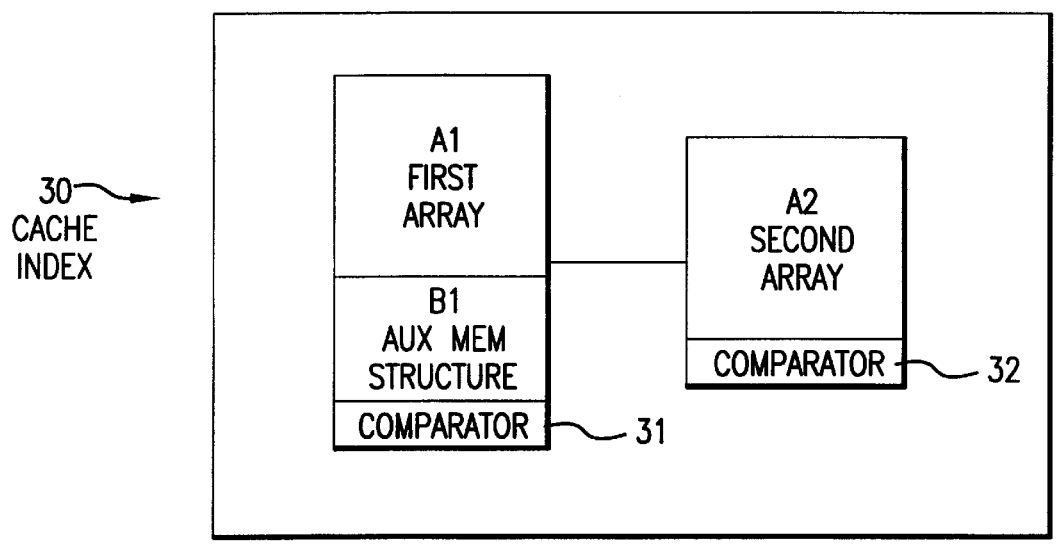
FIG. 1C shows a schematic view of an embodiment of a cache index according to the present invention.

FIG. 1C shows an exemplary structure of a cache index 30 according to the present invention. In this embodiment, the cache index 30 includes two arrays A1 and A2. The cache index 30 also includes, for example, an auxiliary memory structure B1 which may store intermediate search results from array A1. Comparitors 31 and 32 are also provided, for example, in the cache index 30. These may be used by the control block 20 to perform comparisons between partial address strings of a requested piece of data and partial address strings contained in the arrays A1 and A2.

Figure 2A:
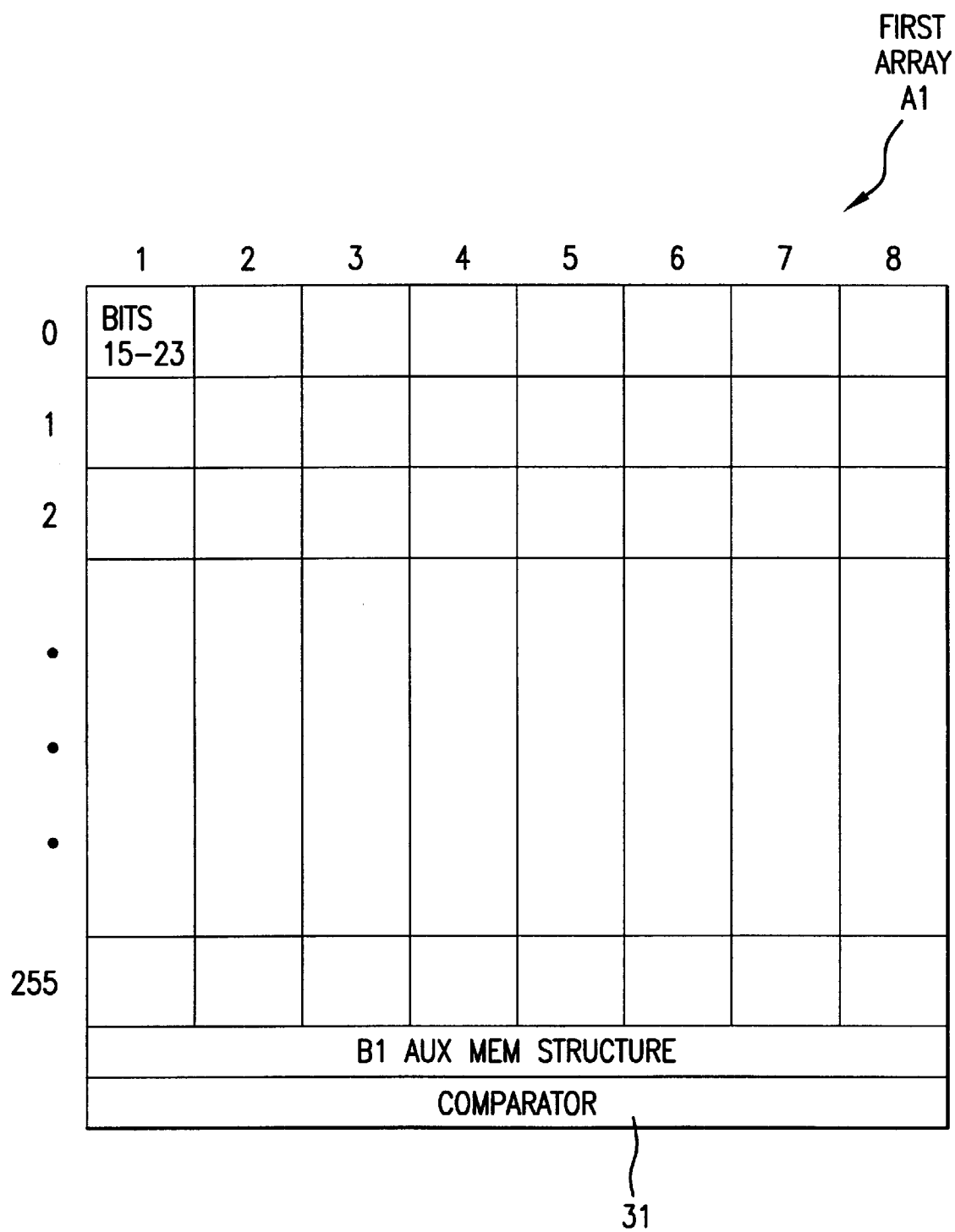
FIG. 2A shows a schematic view of an array of the cache index of FIG. 1C.
Figure 2B:
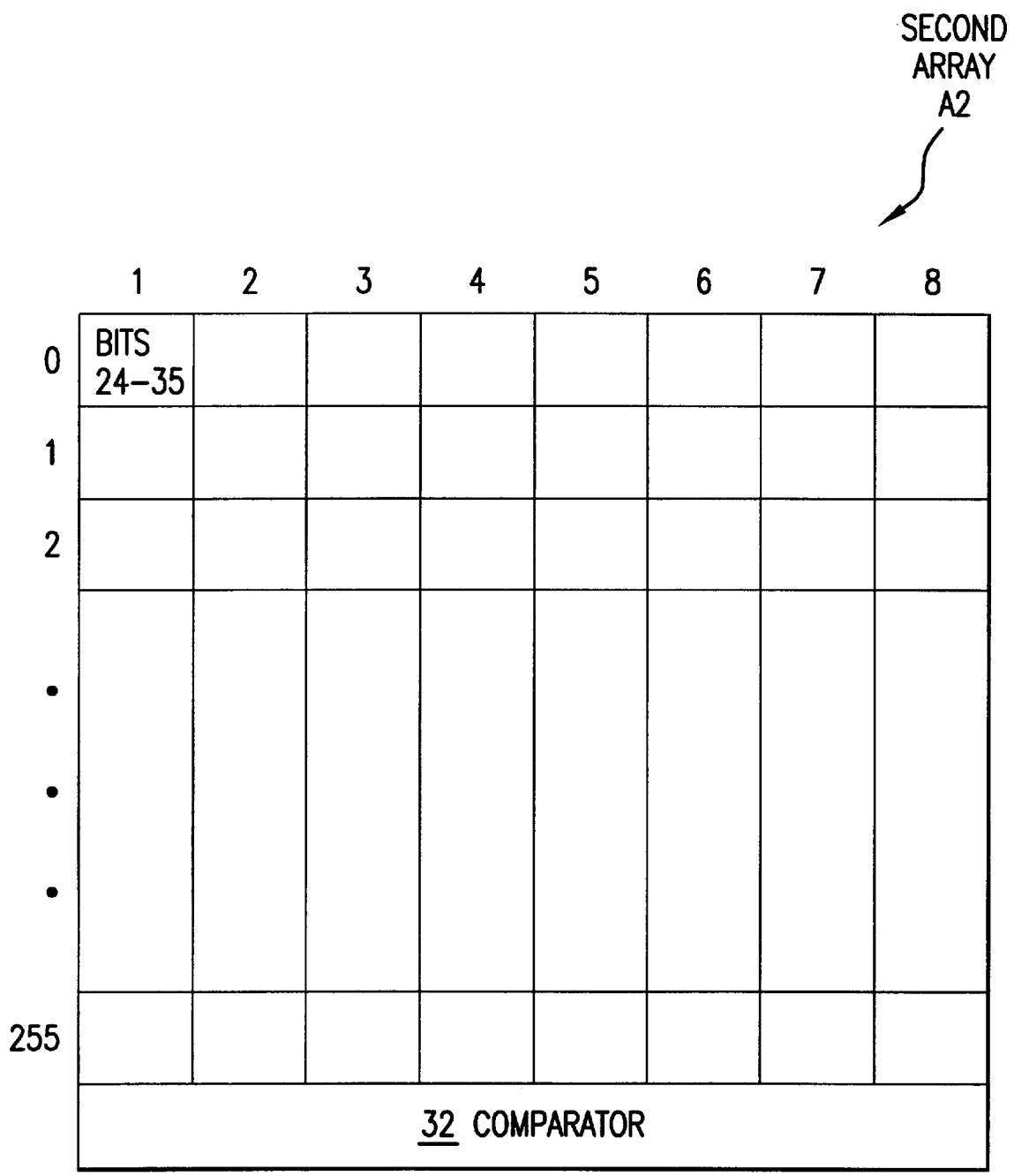
FIG. 2B shows a schematic view of a second array of the cache index of FIG. 1C.

FIGS. 2A and 2B show this exemplary cache index 30 in greater detail. The cache index 30 stores address tags or simply "tags" for the actual data stored in the cache data array 40. As noted above, the cache index is organized into, for example, two separate arrays A1 and A2. Each of the two arrays is further organized into, for example, 256 sets, each of the sets containing, for example, 8 ways (other particular configurations being possible).

The number of ways in each set generally indicates the number of entries that may be stored in each set. One skilled in the art will understand that, given two caches with the same number of total entries (e.g. 2048), the cache organized into fewer sets and a greater number of ways (e.g. 256 sets in 8 ways) will be more architecturally flexible than one having a greater number of sets and fewer ways (e.g. 512 sets in 4 ways). In particular, the former will be able to store data in more combinations than the latter. However, the expanded options provided by the former arrangement generally lead to longer search times.

As noted above, an embodiment of the present invention utilizes two arrays A1 and A2, each organized into, for example, 256 sets and 8 ways, which are used to store address tags. The separate arrays A1 and A2 store different portions of the address tag. The first array A1 stores, for example, tag bits 15–23 of an address tag.

These bits form a so-called "micro-tag" or "µtag" which is used, for example, for way prediction. The second array A2 stores, for example, tag bits 24–35 of an address tag. These bits form a so-called "upper tag" and may be used to confirm a predicted address hit. Thus in an exemplary embodiment, the first array A1 stores a nine bit tag (bits 15–23) in 256 sets and 8 ways, while the second array A2 stores a 12 bit tag (bits 24–35) in 256 sets and 8 ways. In array A1, the 256 sets are organized into, for example, 32 blocks of 8 sets each. It can be understood that the address tag may be any suitable length. In addition, the bits comprising the address tag may be apportioned between the two arrays A1 and A2 in any suitable manner (i.e. the micro-tag and upper tag may each include any suitable number of bits).

The cache index 30 according to the illustrated embodiment of the present invention differs from known cache indexes in that it includes, for example, auxiliary memory structure B1 for receipt and storage of intermediate search results. As described below, this auxiliary memory structure B1 allows searching of the cache index based upon a partial physical address that need not uniquely identify an individual set that can contain the requested data.

In the system employing the illustrated embodiment of the cache index 30 25 of the present invention, bits 0–11 of each virtual or linear address are, for example, identical to (or otherwise untranslated from) bits 0–11 of each corresponding physical address. Of these bits, bits 0–6 are used, for example, to address the data within each entry of the cache. Thus these bits are not used for addressing the entries themselves within the cache index 30. In contrast, bits 7–11 of the physical address may be used for indexing the entries stored in the cache data array 40. These bits therefore identify, for example, a partial physical address for cache indexing purposes. It can be understood that this partial physical address need not include the exemplary bits 7–11, but that other bit strings may be equally useful in practicing the present invention.

In the exemplary embodiment, the 5-bit string 7–11 may be used to identify $2^5$, or 32, individual memory locations. These 32 individual memory locations correspond, for example, to the 32 blocks of 8 sets each in the array A1. Accordingly, bits 7–11 may be used (by, for example, the control block 20) to identify the particular block in array A1 that might contain the address of a requested piece of data. The control block 20 may then cause the selected block to be read to the additional memory structure B1. Because bits 7–11 are available as soon as the data request is received, the control block 20 may perform these functions without waiting for a translation of the requested address.

Unlike bits 7–11, bits 12–35 of each virtual address are, for example, not identical to bits 12–35 of the corresponding physical address. Rather bits 12–35 must be translated by the system to generate bits 12–35 of the physical address. This translation may be performed using any known technique and typically requires a full clock cycle or more. In an exemplary embodiment, the translation occurs while bits 7–11 are used to identify the selected block discussed above. The translation may also be performed in parts, so that a portion of the (translated) bits become available before the remaining bits. In an exemplary embodiment, bits 12–23 are available to the cache index 30 first, followed by bits 24–35.

Bits 12–35 of the physical address may perform a variety of functions with respect to addressing data within the cache. In an exemplary embodiment, the 3-bit string of bits 12–14 are used, for example, to index the eight individual sets within each block, so that bits 7–14, as a group, uniquely index each of the 256 sets of the cache index 30. Thus when bits 12–14 are available, they may be used, for example, by control block 20 to multiplex the eight sets of the identified block down to a single selected set that might contain an address tag of the requested data.

Once the selected set is identified, bits 15–35 may be used to identify the individual way, if any, which contains the address of the requested data. In the exemplary embodiment, bits 15–23 are used, for example, to execute a 9-bit compare for way prediction. Specifically, these bits are compared, for example, on the eight ways of the selected set. Alternatively, this 9-bit compare may be performed on all eight sets before bits 12–14 are used to multiplex the eight sets of the identified block down to a selected set.

If a hit is predicted (i.e. if bits 15–23 of the requested data match a 9-bit tag in the selected set), then bits 24–35 may be used to confirm whether the predicted way actually contains the requested data. Specifically, these bits may be compared on array A2 or some portion thereof (e.g. a single set) to determine if a predicted way contains the requested data or instead contains a different piece of data having the same 9-bit tag as the requested data. Techniques and algorithms for performing the necessary compares are well known in the art.

Figure 5A:
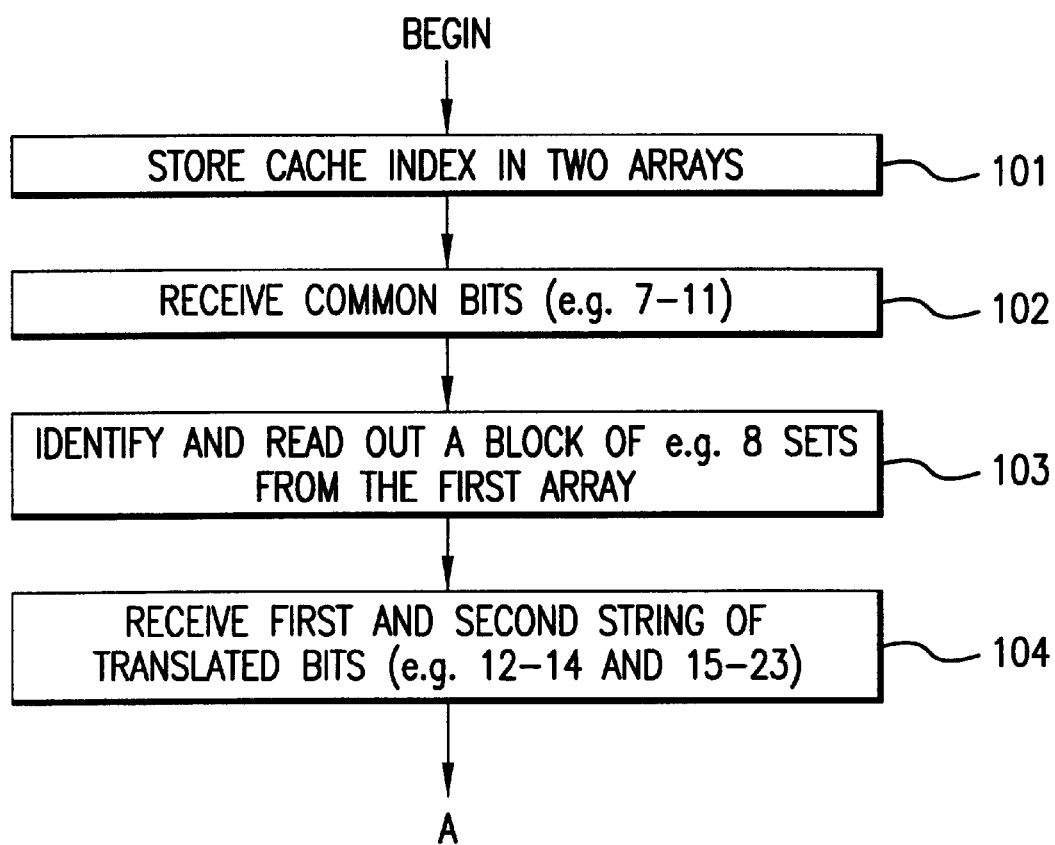
FIGS. 5A, 5B, and 6 show a flow diagram of a method according to the present invention.
Figure 5B:
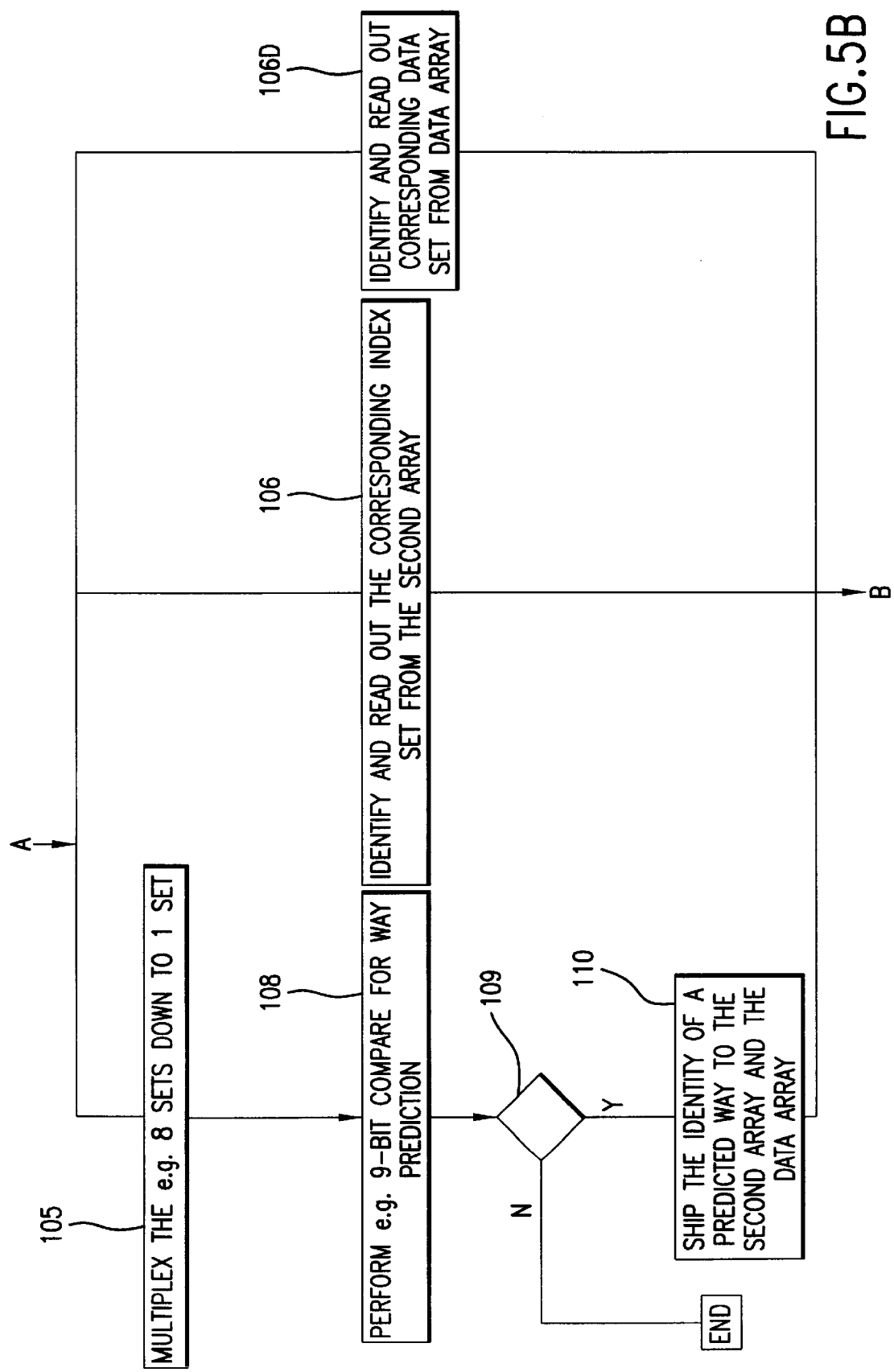
Figure 6:
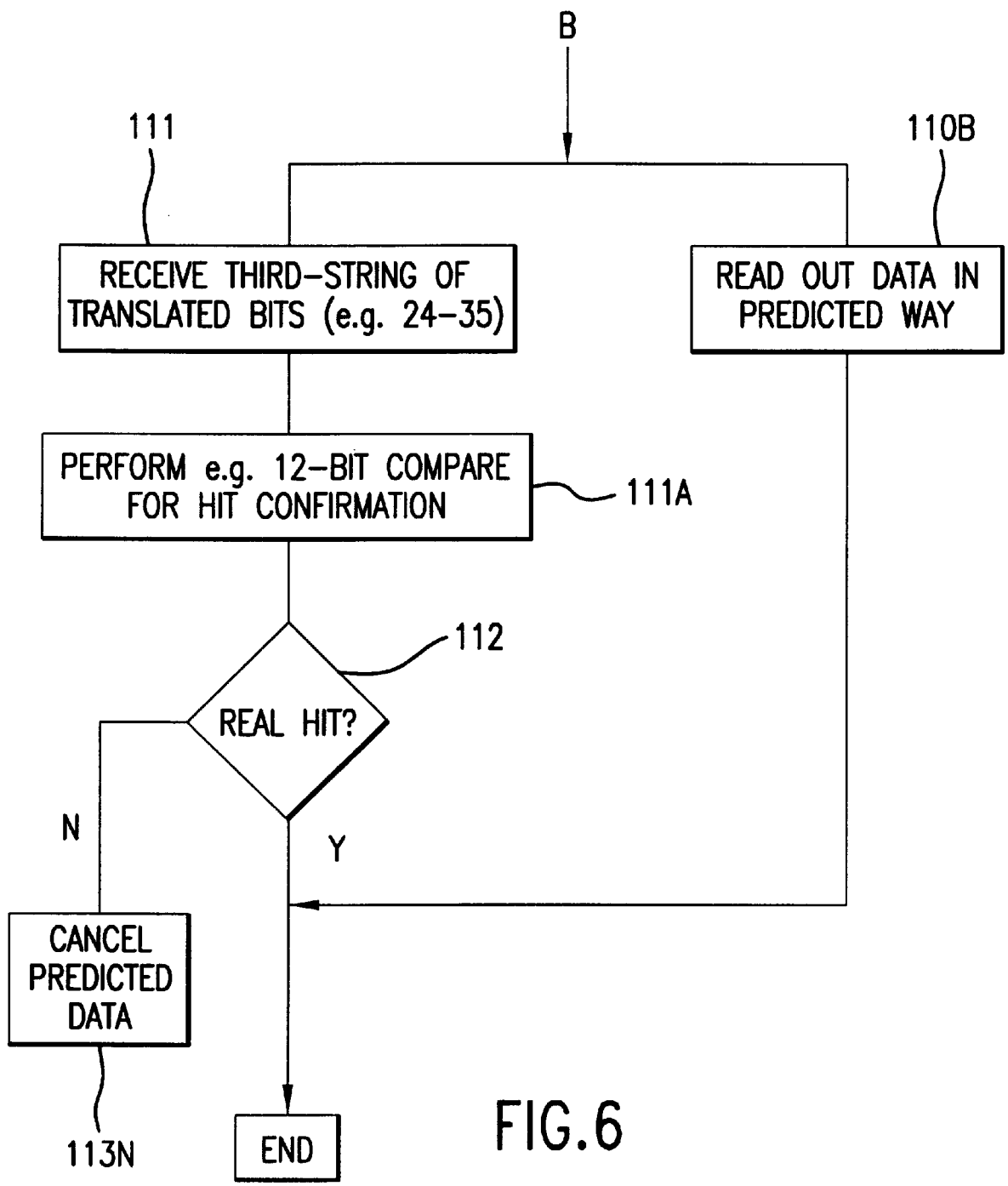

FIGS. 5A, 5B and 6 outline a method of searching an embodiment of a cache index according to the present invention. The method begins with step 101 of FIG. 5, with the cache index maintained in an initial configuration organized, for example, into 2 arrays. For purposes of clarity, the illustrated method is described in connection with the exemplary cache index described above. Thus the first array stores, for example, a number of 9-bit strings, and the second array stores, for example, 12-bit strings.

Upon receiving a request for data that contains a virtual address for the requested data (step 102), the cache index (aided by, for example, a control block 20) receives bits 7–11. These bits 7–11 are untranslated, for example, from bits 7–11 of the physical address of the data. As noted above, this 5-bit string of bits 7–11 uniquely identifies one of 32 blocks of 8 sets in the 256 set cache index.

Figure 3:
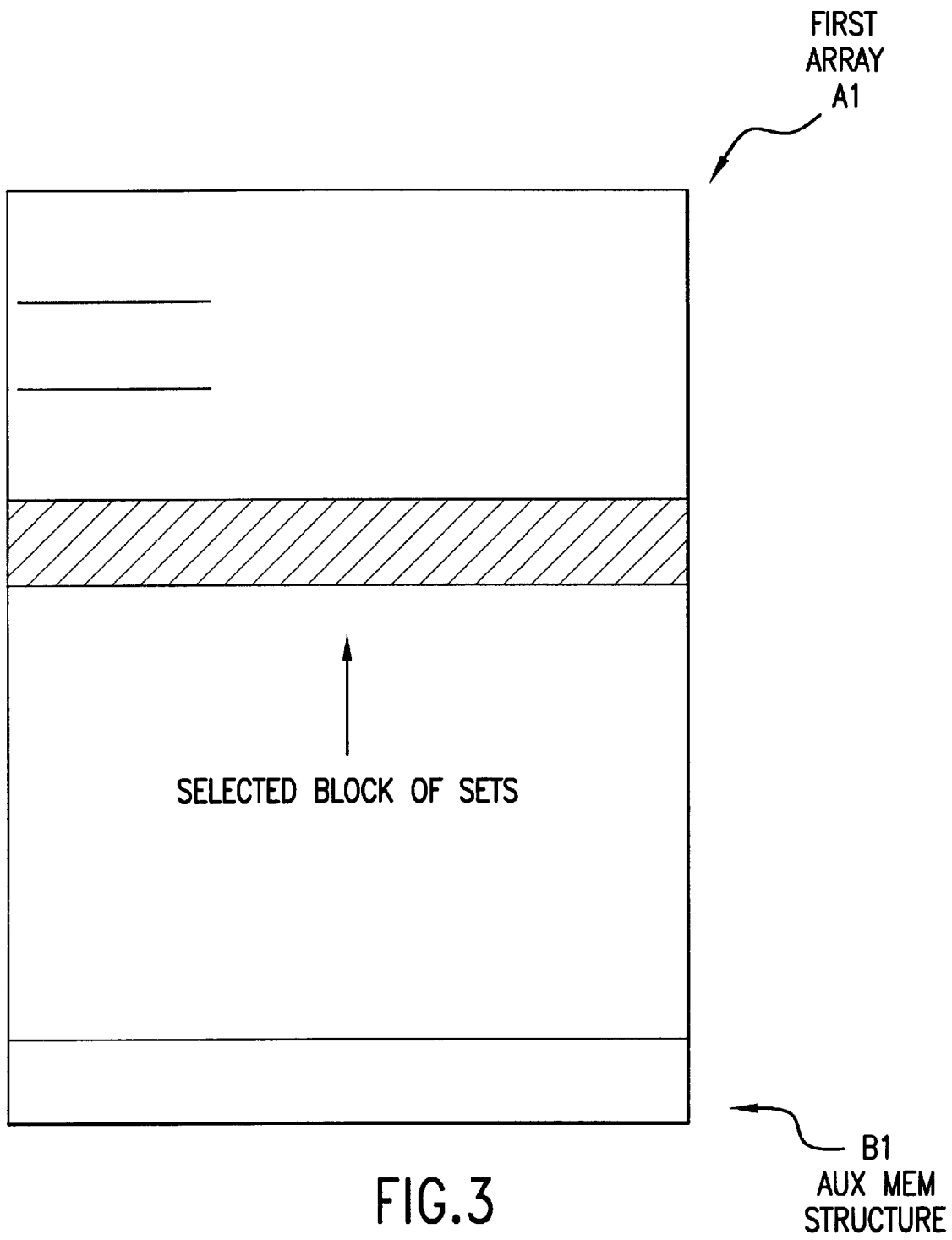
FIG. 3 shows a schematic view of an embodiment of an array of a cache index according to the present invention with an identified block of sets.
Figure 4:
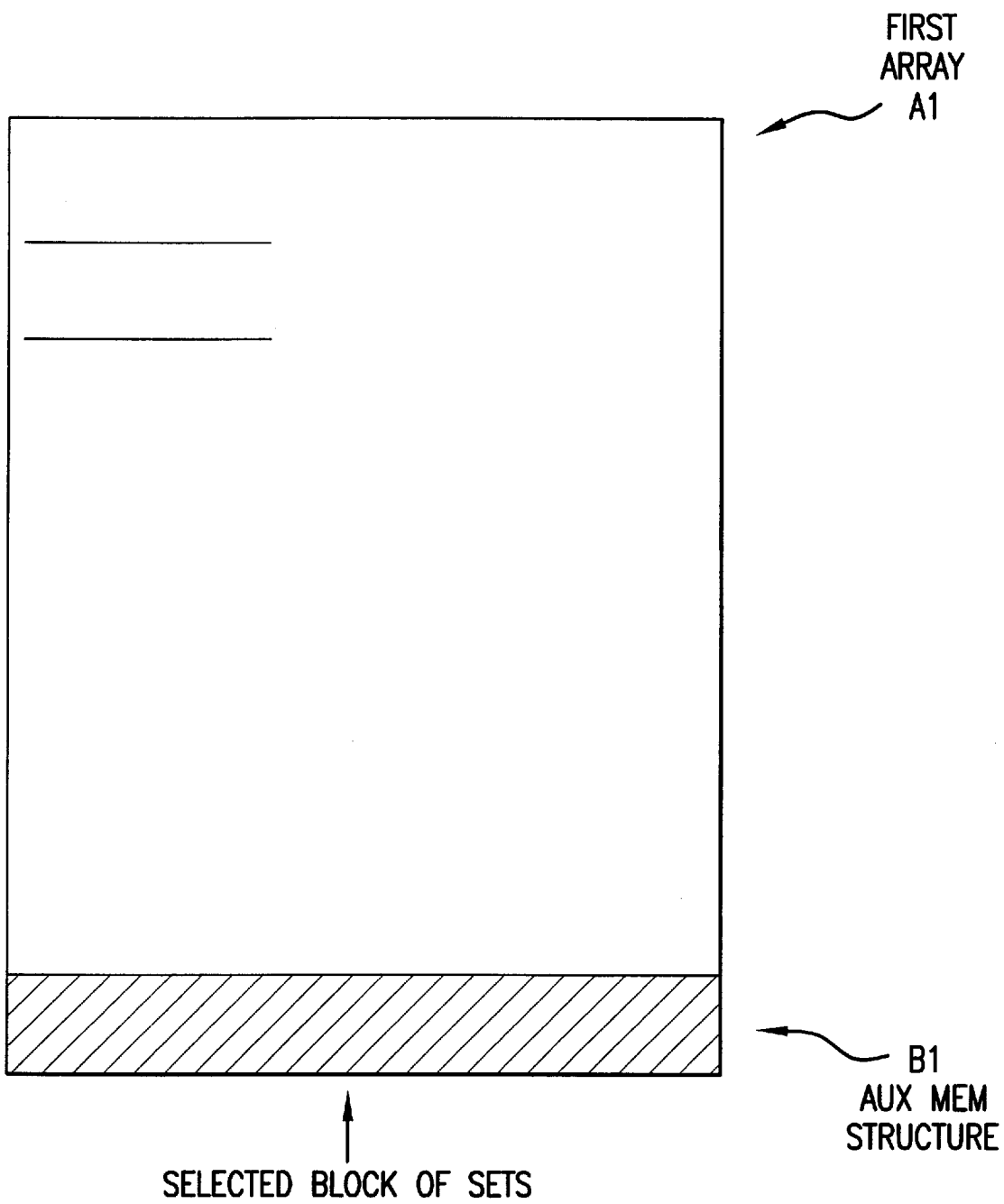
FIG. 4 shows a schematic view of the array of FIG. 2 with an identified block of sets read out to an auxiliary memory structure.

Accordingly, upon receiving bits 7–11, the system (e.g. the cache unit 10) can identify a single block of 8 sets in first array, as shown in FIG. 3. The system can then read out this block of 8 sets (step 103) into the auxiliary-memory structure B1, as shown in FIG. 4. Because bits 7–11 in the virtual address are untranslated from bits 7–11 in the physical address, the system can perform this initial search and retrieval without waiting for the translation of the entire virtual address.

While the system performs this preliminary searching and reading out, the remainder of the virtual address may be translated in the background to generate the remainder of the physical address. In an embodiment of the present invention, the system receives the translated bits in two steps, first bits 12–23 and later bits 24–35.

Once the translation of bits 12–23 from the virtual address to physical address is complete, the cache index can receive these bits, including bits 12–14 (step 104).

At this point, the system may perform several sets of steps concurrently. First, the 3-bit string 12–14 allows the system to multiplex the 8 sets of the read-out block down to a single set (step 105). This single set potentially stores an address tag for the requested data. The system then compares, for example, bits 15–23 of the physical address on each of the ways of the single selected set identified in step 105 (step 108). In the present exemplary embodiment, this 9-bit string is compared on all eight ways of the set. If bits 15–23 match any of the 9-bit strings contained in the read-out block (step 109), the system predicts a hit and ships, for example, the identity of a predicted way to the data array and the array A2 (step 110). If bits 15–23 do not match any of the 9-bit strings contained in the memory structure B1, then the data is not in the cache, and the system must look elsewhere for the requested data (step 109N).

Second, concurrent with the above steps, an individual corresponding index set of the array A2 may be identified using the bits 7–14. The system may then read out the corresponding index set from the second array into, for example, the comparitor 32 (step 106).

Third, concurrent with the above steps, address bits 7–14 may likewise be used to identify a corresponding data set in the cache data array 40. This corresponding data set is, for example, the single selected set that might contain the requested data (as opposed to the requested data address tags, which are contained in arrays A1 and A2).

Assuming a hit has been predicted in step 110, the cache may begin a read out of the predicted way of the selected set of the data array (step 110B). Next, while the data is being shipped, the system receives, for example, bits 24–35 of the physical address and compares those bits, for example, on the predicted way of the corresponding index set identified in step 106. In other words, the 12-bit physical address string is compared to the 12-bit string in the predicted way of the corresponding index set (step 111). If a match occurs (e.g. if the 12-bit string is identical to the 12-bit string in the predicted way), the predicted hit is confirmed (step 112) and the data being shipped by the cache to the processor may be used. If no match occurs, the data being shipped is not the requested data. The processor can, for example, ignore the shipped data, or the shipped data may otherwise be canceled (step 113).

It can be understood that the method and apparatus according to the present invention need not be limited to cache indexes of the structure described above. Rather, the method and apparatus according to the present invention may be used with any cache index in which each virtual address and corresponding physical address share some untranslated bits and in which these common bits do not uniquely identify a set containing the requested data.

Figure 7:
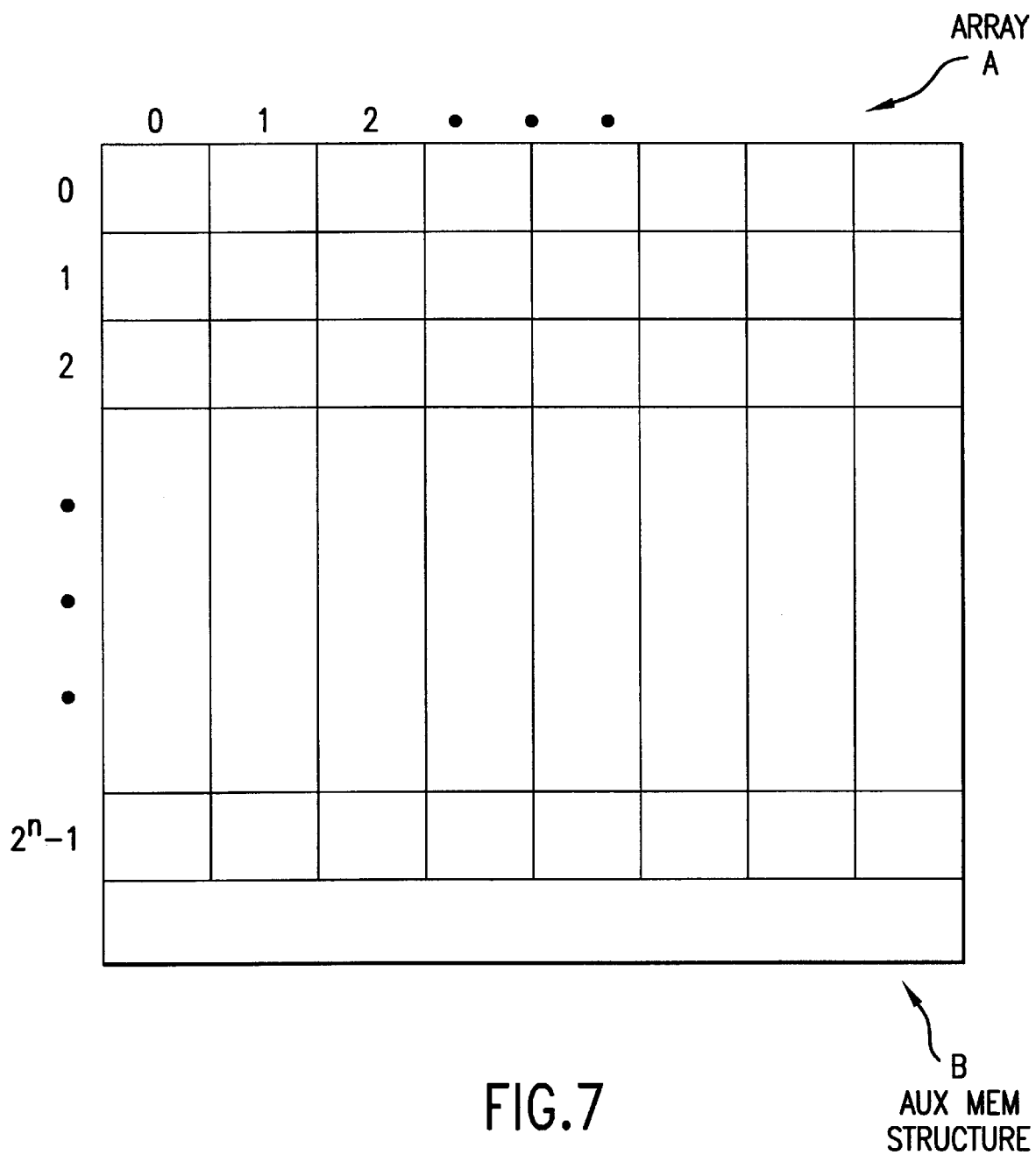
FIG. 7 shows a schematic view of another embodiment of an array of a cache index according to the present invention.

FIG. 7 shows, for example, a cache index organized into $2^n$ sets. One skilled in the art can understand that a string containing at least n bits is required to uniquely identify each of the $2^n$ sets contained in the cache index as shown in FIG. 5. In searching this array for a particular set, if less than n bits are common between the virtual address and the physical address, then the virtual address must be translated to obtain the physical address before the particular set can be uniquely identified.

The method and apparatus according to an embodiment of the present invention, however, allow a search to begin based upon the partial physical address formed by any bits common to the virtual and physical addresses. If a number k of bits are shared between the virtual address and the physical address, where k is less than n, then the cache index can be subdivided into, for example, $2^k$ blocks, each block containing $2^{(n-k)}$ sets. Each string of k shared bits can then be used to uniquely identify one of the $2^k$ blocks within the cache index. The $2^{(n-k)}$ sets may therefore be read out into an auxiliary memory structure B shown in FIG. 5, and these sets may be later multiplexed down to 1 set when the full physical address is available.

It can be understood that the "blocks" need not be represented in the actual architecture of the cache index. Instead, it is merely required that the available common bits be utilized to reduce the potential hits (i.e. the potential sets) to a minimum, and that these potential sets be read out to an auxiliary memory structure for later multiplexing down to a single set.

Figure 8A:
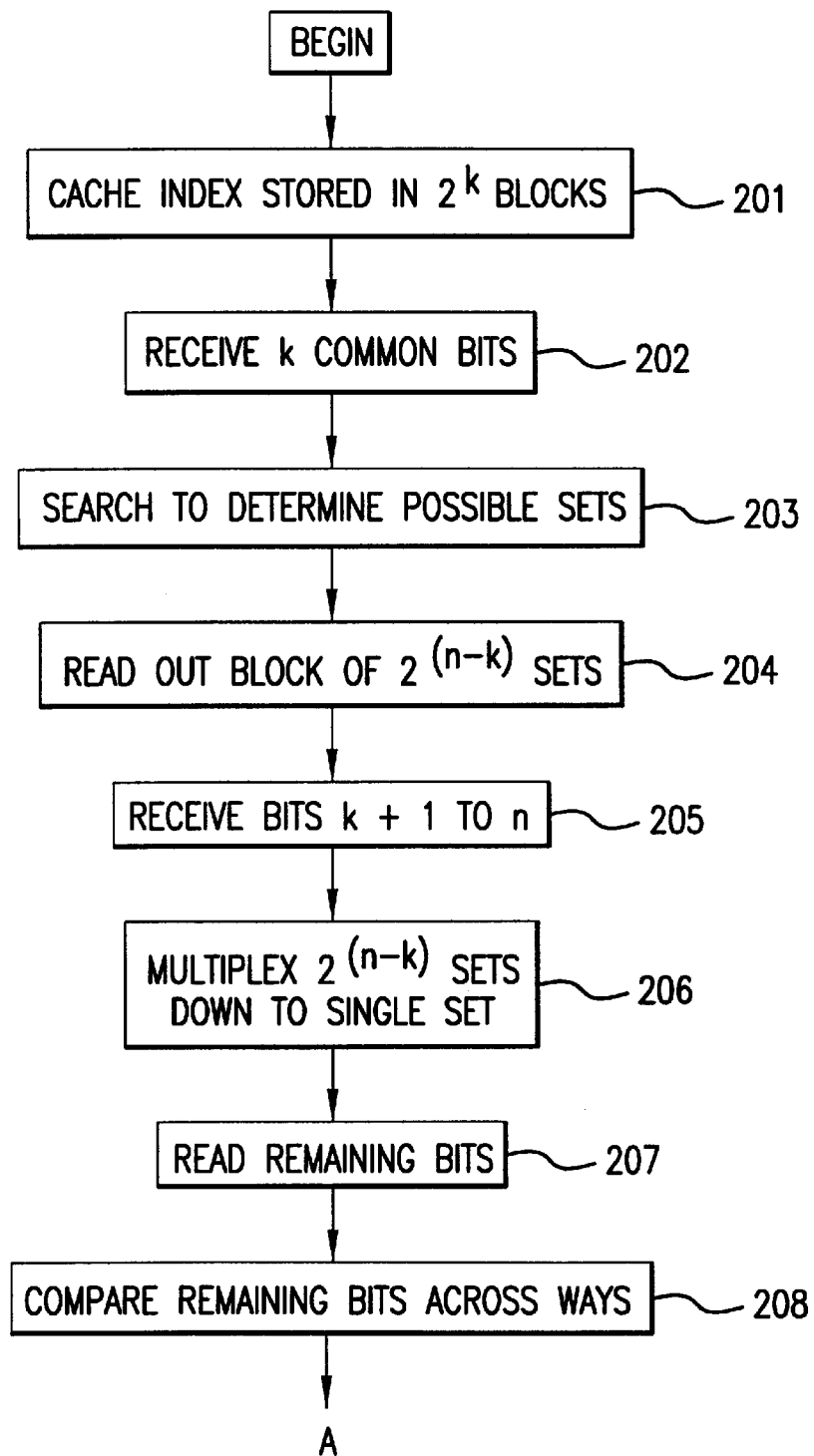
FIGS. 8A and 8B show a flow diagram of a method for searching the data array of FIG. 7.
Figure 8B:
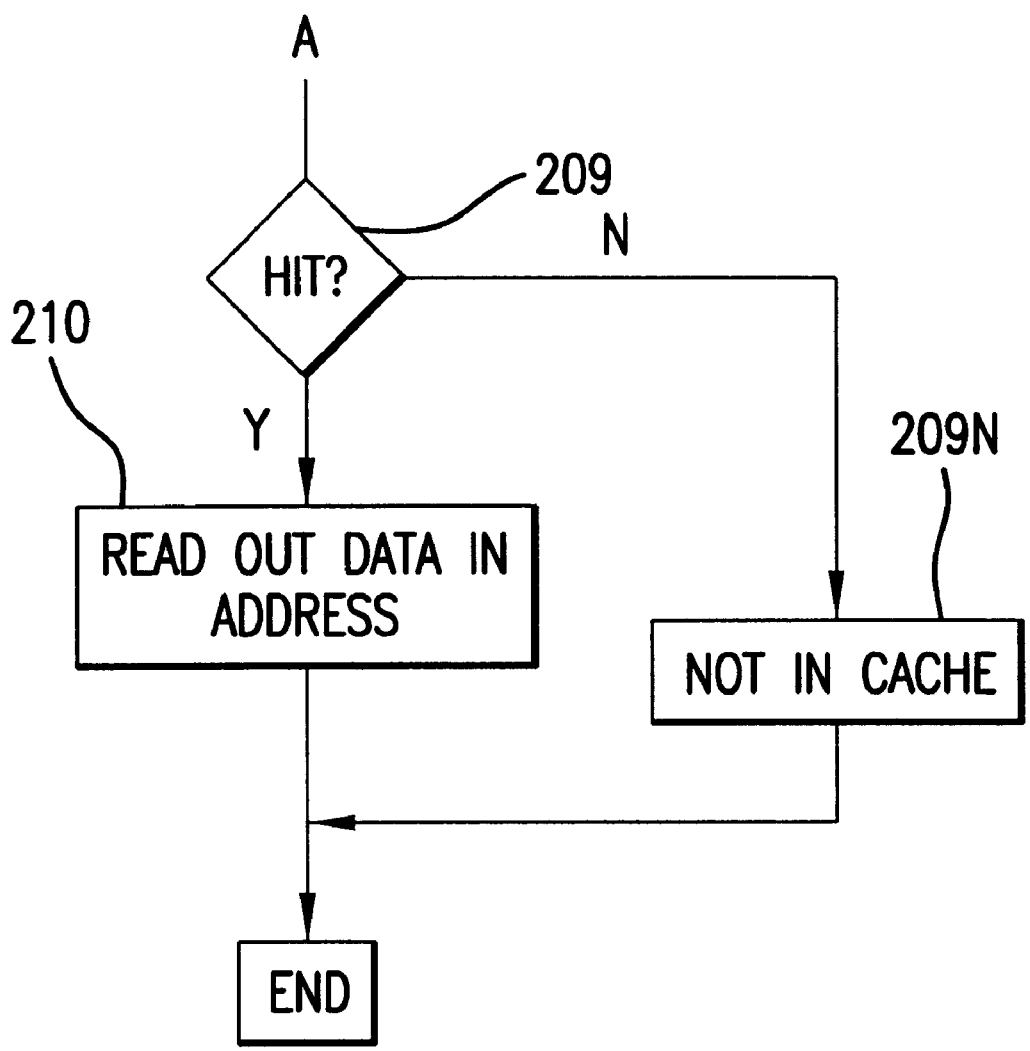

A further exemplary method corresponding to the above is outlined in detail in FIG. 8. In step 201, the cache index array is organized, for example, into $2^k$ blocks, where k is the number of shared bits between the virtual address and the physical address. Each block contains, for example, $2^{(n-k)}$ sets, with $2^n$ being the total number of sets contained in the cache.

Upon receiving a request for data that includes the virtual address of the requested data, the system immediately receives the string of k bits common to both the virtual address and the physical address (step 202). Using this string, and without waiting for the translation of the full physical address, the system searches the array and determines which block might contain the requested data (step 203). Once that block is identified, the system reads out the $2^{(n-k)}$ sets contained within that block to an auxiliary memory structure B shown in FIG. 5 (step 204).

Once the full physical address has been translated, the $2^{(n-k)}$ sets can be multiplexed down to 1 set (step 206). Remaining address bits may then, for example, be read (step 207) and compared to the address strings contained in the ways of the set to determine whether the requested data is contained within the cache (step 208). If the compare registers a hit, the data may be read out (step 210). If no hit occurs, the data is not within the cache (step 209N).

It can also be understood that the number or sets and number of blocks need not be powers of two (e.g. $2^n$ where n is an integer). Even if the number of sets or blocks is not a power of two, bits common to both the virtual and physical addresses can be used to eliminate all but a subset of the sets. This subset of sets (e.g. a block) may the be read out and later multiplexed down to one set when other address bits become available.

The cache index and method according to the present invention have been described with respect to several exemplary embodiments. It can be understood, however, that there are many other variations of the above described embodiments which will be apparent to those skilled in the art. It is understood that these modifications are within the teaching of the present invention which is to be limited only by the claims appended hereto.

What is claimed is:

1. A cache, comprising:
   a data array;
   a cache index coupled to said data array, said cache index comprising:
      a first array, wherein the first array is organized into a plurality of first-array sets, the plurality of first-array sets is organized into a plurality of blocks, each of the plurality of blocks contains a subset of the plurality of first-array sets, each of the plurality of first-array sets contains a plurality of ways, and each of the plurality of ways of the first-array sets contains a first partial address tag; and
      a second array coupled to the first array.

2. The cache of claim 1, wherein the first array is coupled to an auxiliary memory structure.

3. The cache of claim 2, wherein the auxiliary memory structure is coupled to a comparator and wherein the second array is coupled to a comparator.

4. The cache of claim 1, wherein the second array is organized into a plurality of second-array sets, each of the second-array sets contains a plurality of ways, each of the plurality of ways of the second-array sets contains a second partial address tag.

5. A method for searching a cache index, the cache index having a first array, the first array organized into a plurality of first-array sets, the first-array sets organized into a plurality of blocks, comprising:
   receiving a virtual address of a requested data element, said virtual address including a common bit that is a partial physical address for the data element;
   selecting a block of sets in a first array of the cache index, using the common bit before the virtual address is completely translated; and
   reading out the selected block into an auxiliary data location.

6. The method of claim 5, wherein each of the first-array sets contains ways, the ways of the first-array sets containing micro address tags, and wherein the method further comprises:
   receiving a first string of translated bits and a second string of translated bits, wherein the first string of translated bits and second string of translated bits each represent part of the physical address of the requested data item;
   multiplexing the selected first-array block using the first string of translated bits to select a potential first-array set; and
   comparing the second string of translated bits on the ways contained within the selected potential first-array set, a hit being predicted when the second string of translated bits matches one of the micro address tags contained within the selected potential first-array set.

7. The method of claim 6, wherein the cache index has a second array and a cache data array, the second array being organized into second-array sets, and wherein the method further comprises:
   sending an identity of a predicted way to the second array and the cache data array when a hit is predicted; and
   identifying in the second array a potential second-array set corresponding to the selected potential first-array set while said multiplexing the selected first-array block, comparing the second string, and sending an identity are performed.

8. The method of claim 7, wherein the cache data array is organized into a plurality of sets, and wherein the method further comprises:
   identifying a data set in the cache data array corresponding to the selected potential first-array set while said multiplexing the selected block, comparing the second string, and sending an identity are performed; and
   reading out predicted data from the cache data array, the predicted data being contained in the predicted way of the identified cache data array set.

9. The method of claim 8, wherein each of the second-array sets contains ways, each of the ways containing confirmation address tags, and wherein the method further comprises:
   receiving a third string of translated bits concurrently with reading out predicted data from the cache data array; and
   comparing the third string of translated bits on the ways of the potential second-array set concurrently with said reading out predicted data from the cache data array, a hit being confirmed when the third string of translated bits matches one of the confirmation address tags contained within the potential second-array set.

10. The method of claim 9, wherein translating a remainder of the virtual address to generate a remainder of the physical address is performed concurrently with said searching on the first array and said reading out the selected first-array block into an auxiliary data location.

11. The method of claim 10, wherein the physical address includes at least 35 bits, and wherein the first string of translated bits includes bits 12–14 of the physical address, the second string of translated bits includes bits 15–23 of the physical address, and the third string of translated bits includes bits 24–35 of the physical address.

12. A method of searching a cache index, comprising:
    receiving a first partial virtual memory address and a second partial virtual memory address, wherein the first partial virtual memory address is the same as a first partial physical memory address;
    translating the second partial virtual memory address into a second partial physical memory address;
    selecting a block of sets from a first array using the first partial virtual memory address, said selecting being initiated prior to completion of said translating the second partial virtual memory address;
    selecting a single first-array set in the block of sets using the second partial physical memory address; and
    determining whether a desired data element is in the cache using information in the selected set.

13. The method of claim 12, wherein said selecting a block of sets and said translating the second partial virtual memory address are performed concurrently.

14. The method of claim 13, wherein said determining further comprises:
    receiving a third partial virtual memory address;
    translating the third virtual memory partial address into a third partial physical memory address, concurrently with said translating the third partial virtual memory address; and
    selecting a first-array potential way within the single selected first-array set using the translated third partial physical memory address.

15. The method of claim 14, further comprising:
receiving a fourth partial virtual memory address;
translating the fourth partial virtual memory address into a fourth partial physical memory address while said selecting a block of sets is performed;
selecting a set and way within a second array that corresponds to the selected first-array set and selected first-array potential way; and
determining that a cache hit is present when the selected set and way within the second array contain a confirmation tag that matches the fourth partial physical memory address.

16. A cache, comprising:
a data array;
a first index array coupled to the data array; and
a control block programed to:
receive a first string of bits and a second string of bits, the first string of bits being untranslated between a virtual address and a physical address, the second string of bits being a partial physical address that was translated from a partial virtual address; and
use the first string of bits to select a block of sets in the first index array and to use the second string of bits to multiplex the selected block down to a selected first-array set.

17. The cache of claim 16, wherein the control block is further programed to select a block of sets in the first index array before receiving the second string of bits.

18. The cache of claim 17, wherein the control block is further programed to:
receive a third string of bits which is a partial physical address that was translated from a partial virtual address;
compare the third string of bits on each of a plurality of ways contained in the selected first-array set; and
predict a hit when the third string of bits matches a partial address tag contained in the selected first-array set.

19. The cache of claim 18, further comprising a second index array, and wherein the control block is further programmed to identify a set in the second index array using the first and second strings of bits.

20. The cache of claim 19, wherein the control block is further programmed to:
receive a fourth string of bits, the fourth string of bits being a partial physical address that was translated from a partial virtual address; and
compare the fourth string of bits on each of a plurality of ways contained in the identified second-array set, a hit being confirmed when the fourth string of bits matches a partial address tag contained in the identified second-array set.

21. The cache of claim 20, wherein the first string of bits has at least 5 bits.

22. The cache of claim 21, wherein the first string of bits has at least 11 bits and includes bits 7–11 of the virtual address.

23. The cache of claim 22, wherein the partial address tag in the first-array set is a 9-bit string and the partial address tag in the second-array set is a 12-bit string.

24. The cache of claim 23, wherein the physical address has at least 14 bits, and the second string of bits includes bits 12–14 of the physical address.

25. A cache index, the cache index having a first array, the first array organized into a plurality of first-array sets, the first-array sets organized into a plurality of blocks, the cache index comprising:
an input port to receive a virtual address of a requested data element, said virtual address including a common bit that is a partial physical address for the data element;
a selector to select a block of sets in a first array of the cache index using the common bit before the virtual address is completely translated; and
a connection to an auxiliary memory structure to read out the selected block into an auxiliary data location.

26. The cache index of claim 25, wherein each of the first-array sets contains ways, the ways of the first-array sets containing micro address tags, wherein the input port receives a first string of translated bits and a second string of translated bits, wherein the first string of translated bits and second string of translated bits each represent part of the physical address of the requested data item, and wherein the cache index further comprises:
a multiplexor to multiplex the selected first-array block using the first string of translated bits to select a potential first-array set; and
a comparator to compare the second string of translated bits on the ways contained within the selected potential first-array set, a hit being predicted when the second string of translated bits matches one of the micro address tags contained within the selected potential first-array set.

27. The cache index of claim 26, wherein the cache index has a second array and a cache data array, the second array being organized into second-array sets, and wherein the cache index further comprises:
a means to send an identity of a predicted way to the second array and the cache data array when a hit is predicted; and
a means to identify in the second array a potential second-array set corresponding to the selected potential first-array set while said multiplexing the selected first-array block, comparing the second string, and sending an identity are performed.

28. The cache index of claim 27, wherein the cache data array is organized into a plurality of sets, and wherein the cache index further comprises:
a means to identify a data set in the cache data array corresponding to the selected potential first-array set while said multiplexing the selected block, comparing the second string, and sending an identity are performed; and
a means to read out predicted data from the cache data array, the predicted data being contained in the predicted way of the identified cache data array set.

29. The cache index of claim 28, wherein each of the second-array sets contains ways, each of the ways containing confirmation address tags, and wherein the input port receives a third string of translated bits concurrently with said reading out predicted data from the cache data array, and wherein the comparator compares the third string of translated bits on the ways of the potential second-array set concurrently with said reading out predicted data from the cache data array, a hit being confirmed when the third string of translated bits matches one of the confirmation address tags contained within the potential second-array set.

30. The cache index of claim 29, wherein translating a remainder of the virtual address to generate a remainder of the physical address is performed concurrently with said searching on the first array and said reading out the selected first-array block into an auxiliary data location.

31. The cache index of claim 30, wherein the physical address includes at least 35 bits, and wherein the first string of translated bits includes bits 12–14 of the physical address, the second string of translated bits includes bits 15–23 of the physical address, and the third string of translated bits includes bits 24–35 of the physical address.

32. A cache index, comprising:

an input port to receive a first partial virtual memory address and a second partial virtual memory address, wherein the first partial virtual memory address is the same as a first partial physical memory address;

translator to translate the second partial virtual memory address into a second partial physical memory address;

a selector to select a block of sets from a first array using the first partial virtual memory address, said selecting being initiated prior to completion of said translating the second partial virtual memory address and to select a single first-array set in the block of sets using the second partial physical memory address; and a comparator to determine whether a desired data element is in the cache using information in the selected set.

33. The cache index of claim 32, wherein said selection of a block of sets and said translation of the second partial virtual memory address are performed concurrently.

34. The cache index of claim 33, wherein:

said input port is to receive a third partial virtual memory address;

said translator is to translate the third virtual memory partial address into a third partial physical memory address, concurrently with said translating the third partial virtual memory address; and said selector is to select a first-array potential way within the single selected first-array set using the translated third partial physical memory address.

35. The cache index of claim 34, wherein:

said input port receives a fourth partial virtual memory address;

said translator translates the fourth partial virtual memory address into a fourth partial physical memory address, while said selecting a block of sets is performed;

said selector is to select a set and way within a second array that corresponds to the selected first-array set and selected first-array potential way; and said comparator is to determine that a cache hit is present when the selected set and way within the second array contain a confirmation tag that matches the fourth partial physical memory address.

* * * * *